Figure 1:
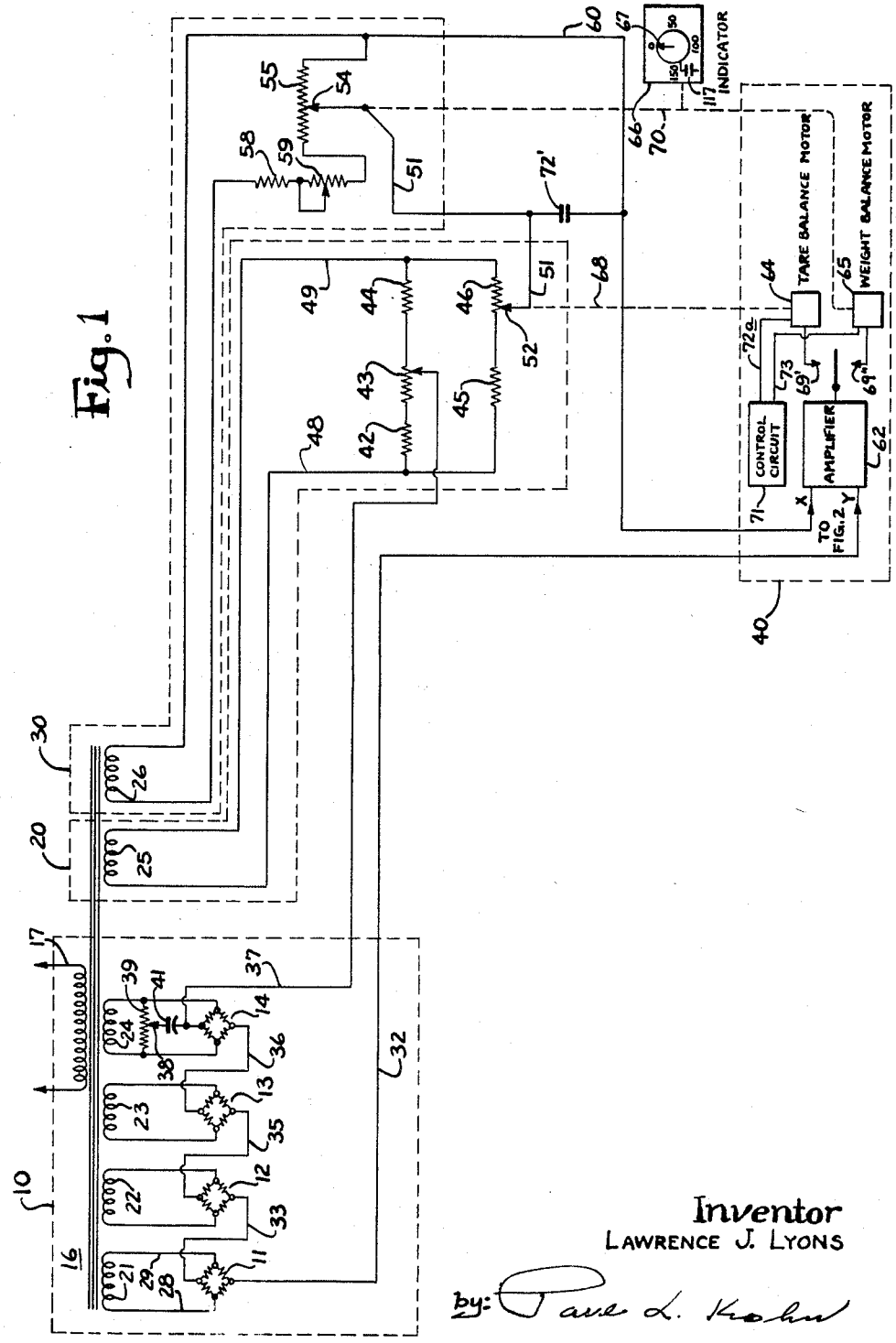

Inventor
LAWRENCE J. LYONS

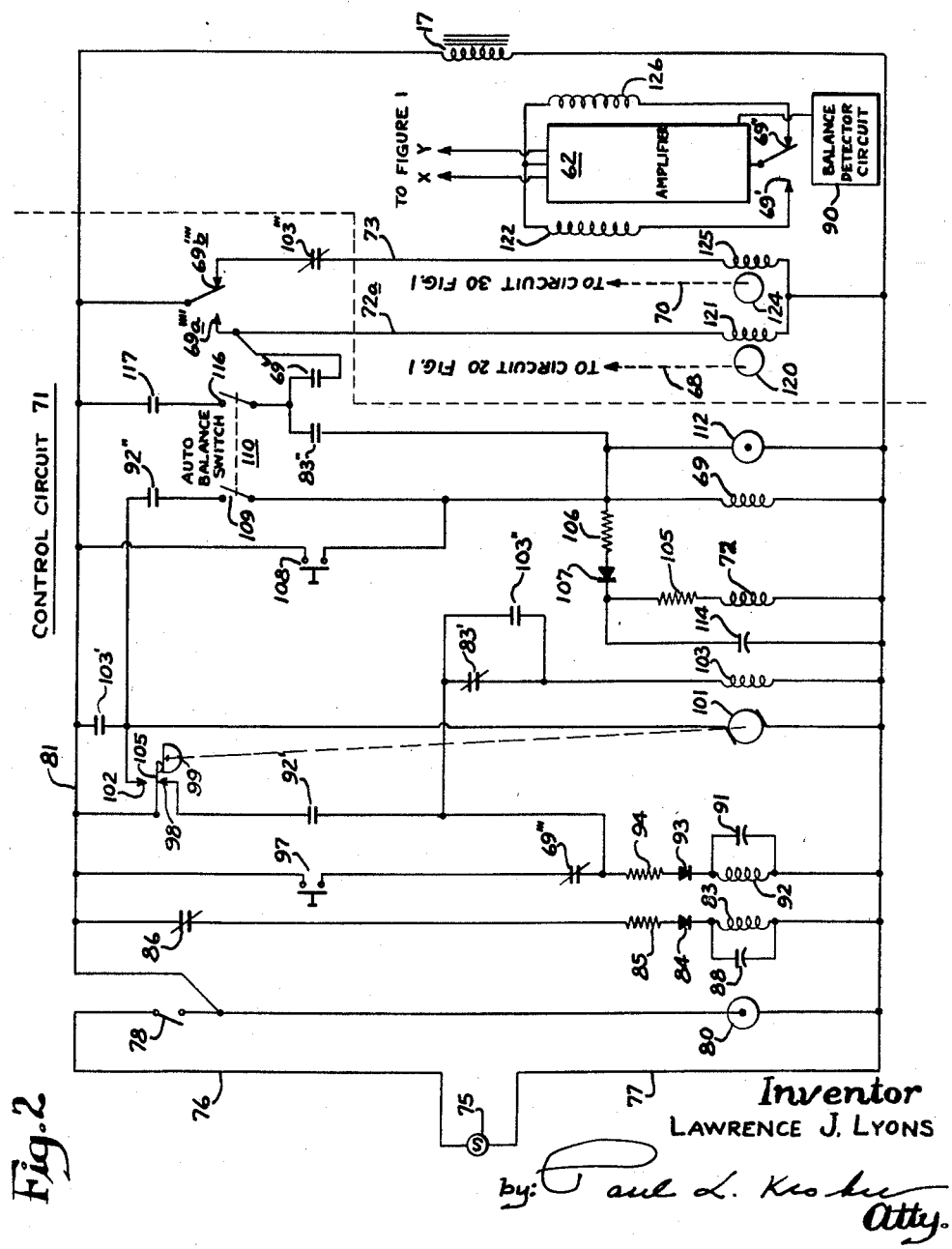

United States Patent Office 2,927,784
Patented Mar. 8, 1960

2,927,784

AUTOMATIC TARE WEIGHT ELIMINATING SCALE

Lawrence J. Lyons, Davenport, Iowa, assignor to Fairbanks, Morse & Co., Chicago, Ill., a corporation of Illinois Application May 31, 1956, Serial No. 588,500

12 Claims. (Cl. 265—5)

This invention relates to electronic weighing scales and in particular to such scales having automatic tare weight eliminating circuitry.

In certain weighing applications, it is desirable to ascertain the net weight of material to be weighed by eliminating from the indicated weight the amount of weight contributed by containers or other extraneous items such as pallets or separators. In other applications, it may be desirable to weigh a succession of items without removing previous items from the scale platform, and yet ascertain the net weight of each item. This latter application is particularly useful where a series of heavy objects are to be weighed individually but accumulated to form a single load. In the past, each individual object has been physically placed on a scale and weighed. The object is then removed and a second object then weighed. The successive addition and removal of these objects represents an undesirable waste of time, particularly in view of modern automatic packaging processes.

In those electronic scales which develop a load indicative voltage signal whose amplitude is proportional to the weight of the object on the platform, the effect of tare weight may be eliminated by introducing into the system a counter-voltage whose amplitude is proportional to the tare weight, and reducing the amplitude of the load indicative voltage signal by such amount. The latter feature, in general terms, is well known in the art.

As used throughout the specification, the term "tare weight" means the amount of load on the scale prior to each separate weighing operation of the net weight of each subsequent load, and is the sum of all previously weighed loads. The tare weight is stored in the tare weight opposing voltage generating circuit prior to the weighing of each new load.

In a particularly useful electronic scale, a provision is made for printing the weight information corresponding to the amount of displacement of an indicator from a zero reference point. Such a scale has been fully disclosed and claimed in a copending application Serial No. 274,166, filed on February 21, 1952 by Louis J. Lauler et al., for "Weighing Scale System With Weight Recorder," said copending application being assigned to the assignee of the present application. The general circuitry of such a scale provides for disabling the printing circuit until a balance condition of the scale obtains, so that incorrect weight recordation is avoided. The present invention constitutes an improvement on such a scale in providing a means for simultaneously printing a record of the net weight of each load without the time delay occasioned by the addition and removal of each one of a series of loads.

It is an object of the present invention to eliminate the effect of the weight of an object upon a scale mechanism after a weighing operation, without the physical removal of the object from the scale mechanism.

It is yet another object of the present invention to provide a scale mechanism which is capable of indicating the net weight of each of a plurality of loads in succession without the necessity of removing therefrom previously weighed ones of the loads.

It is a further object of the present invention to provide a weighing scale which prints a record of the weight of an object and simultaneously eliminates the effect of the weight of that object upon the weighing machanism without its physical removal therefrom.

The above and other objects and novel features will become more apparent from the detailed description of the preferred embodiment taken in conjunction with the accompanying drawings. The disclosed embodiment is presented to illustrate the manner of operation of the present invention, but is not to be construed as limiting the invention to the specific circuitry shown, nor as affecting the scope of the claims.

In the drawings:

Figure 1 is a schematic representation partly in block form, illustrating a preferred embodiment of the invention, and Figure 2 is a detailed schematic wiring diagram illustrating a portion of the embodiment of Figure 1 in greater detail.

The general operation of the tare weight and net weight circuitry may be best illustrated by reference to Figure 1 in which the major components are shown in dashed blocks 10, 20, 30, and 40. The circuitry enclosed in rectangle 10 comprises four load cells 11—14 of the conventional strain gage type having the sensing resistance windings of each arranged in the form of a four arm Wheatstone bridge. In the preferred embodiment, a rectangular weight receiving platform (not shown) is supported at each of its four corners by one of the illustrated load cells. In the conventional manner each of the load cells is pressure sensitive and develops an output voltage the magnitude of which is a direct function of the applied weight. A main transformer 16 having a primary winding 17 connected to a source of alternating potential, serves as a source of power to the input circuits of the individual load cells through a plurality of secondary windings 21—24.

As each of the load cell circuits is identical, the circuitry of load cell 11 only will be described. The secondary winding 21 of transformer 16 is connected over conductors 28 and 29 to the input circuit of the Wheatstone bridge formed by the resistance strain gage elements of load cell 11. The output circuit of load cell 11 is connected over conductor 32 to the input of amplifier and control circuit 40, and in series with the output of the next succeeding load cell 12 over conductor 33. Each of load cells 12—14 have their input circuits connected respectively to secondary windings 22—24 of transformer 16 and their output circuits connected in additive series over conductors 35—37. The voltage signal between conductors 32 and 37 is the sum of the voltage signals generated by the four load cells 11—14, and its magnitude is a direct function of the load applied to the platform.

It is evident that a single load cell may be substituted for the four load cells in an appropriate application. Because of the effect of inductance of the secondary windings, there may appear in certain cases a quadrature voltage or a voltage 90° out of phase with respect to the weight generated voltage signal. To minimize the effect of such quadrature voltage, the system includes a compensating circuit comprising a potentiometer 39 connected in parallel across secondary winding 24 and a condenser 41 connected between a variable tap 38 of potentiometer 39 and the output conductor 37. Variable tap 38 may be adjusted until the quadrature voltage generated by the inductance of the secondary windings is cancelled out by an equal correcting voltage developed across condenser 41.

In general, the operation of the electronic scale may be characterized by the development of a voltage signal the magnitude of which is proportional to the weight of the load applied to the platform, and the generation of an opposing voltage signal which is variable in magnitude to cancel out the weight indicative voltage signal. In adjusting the opposing voltage signal to a proper magnitude, it has been customary to compare the two signals and then to adjust, by means of a servomechanism whose angular rotation is a function of the voltage difference between the two signals, a variable opposing voltage network to reach a null condition. The amount of angular rotation of the servomechanism is translated into a visual indication of the weight of the load and is used to move the printing wheels of a recording device into proper relationship to permit printing a record of the weight of the load.

The voltage opposing network may comprise two separate circuits, one in which a tare weight is generated to balance out the tare weight of the load or to eliminate the effect of a load remaining on the scale when a new load is to be weighed without removal of the previously weighed load, and the other which generates a voltage signal to balance out the net weight of the load. The preferred embodiment utilizes a tare weight opposing voltage generating circuit 20 and a net weight opposing voltage generating circuit 30.

Tare weight opposing voltage generating circuit 20 comprises secondary winding 25 of transformer 16, which is wound so as to produce a voltage in opposition to that produced by windings 21—24. The tare weight opposing voltage circuit proper, comprises two sets of series connected resistors 42—44 and 45, 46 connected over conductors 48 and 49 in parallel circuit relationship with each other and in series relation with secondary winding 25.

Resistors 42 and 44 are of fixed value, and with variably tapped resistor 43 form a zero adjusting circuit which may be used in the conventional manner to achieve a zero voltage signal at the output of the tare weight opposing voltage circuit for zero load on the scale platform.

Fixed resistor 45 and variably tapped resistor 46 are adjusted to produce the appropriate tare weight opposing voltage signal used in eliminating the effect of the tare weight of the load in a manner to be more fully explained hereinafter. In general, these latter resistors form a variable voltage divider across the secondary winding 25 of transformer 16, which is adjustable to equal the value of the tare weight voltage signal produced by the load.

In additive series relationship with the tare weight opposing voltage signal producing network 20 and in subtractive series relationship with the load cell generated voltage signal, is a net weight opposing voltage generating network 30 connected to circuit 20 over conductor 51 which is connected between variable tap 52 of potentiometer 46 and variable tap 54 of potentiometer 55.

Secondary winding 26 of transformer 16 is wound in opposing fashion with respect to each of secondary windings 21—24 and is connected in series with potentiometer 55 and resistors 58 and 59. The latter resistors form a span adjusting circuit in the conventional manner, to insure a full scale deflection of the indicator for full capacity load on the platform.

The output circuit of net weight opposing voltage circuit 30 is connected from one side of potentiometer 55 to the other side of the input circuit of amplifier and control circuit 40 over conductor 60.

Amplifier and control circuit 40, which is shown in greater detail in Fig. 2, includes an amplifier 62, the input circuit of which is connected to load cell circuit 10 over conductor 32 and to net weight opposing voltage generating circuit 30 over conductor 60. The output circuit of the amplifier is arranged to be connected to either tare balance servomotor 64 or weight balance servomotor 62 by means of relay contacts 69' and 69" respectively, whose operation will be described in detail hereinafter. Amplifier circuit 62 amplifies the difference in voltage between amplitude of the weight signal voltage produced in the load cell circuit 10 and the sum of the amplitudes of the tare weight opposing voltage and the net weight opposing voltage.

Tare balance servomotor 64 has an input control circuit adapted to be connected to the output of amplifier 62 over relay contacts 69' operated by relay 69 (shown in greater detail in Figure 2). The rotating shaft of tare balance motor 64 is coupled to tap 52 of tare balancing potentiometer 46 by a mechanical coupling arrangement designated by numeral 68. This linkage may comprise mechanical gears or other suitable means well known in the art.

Weight balance servomotor 65 has its input control circuit adapted to be connected to the output circuit of amplifier 62 over relay contacts 69" operated by relay 69 (shown in greater detail in Figure 2). The rotating shaft of weight balance motor 65 is mechanically coupled to variable tap 54 of potentiometer 55 in the net weight opposing voltage circuit 30 by means of a suitable mechanical gearing arrangement designated by numeral 70 but not shown in detail. The rotating shaft to servomotor 65 is also coupled to visual weight indicator 66 in the well known manner. Indicator 66 comprises a dial and pointer combination 67 which visually indicate the net weight of the load.

A control circuit 71, the details of which are shown in greater detail in Figure 2, is connected to the reference circuits of tare balance motor 64 and weight balance motor 65 over conductors 72a and 73, respectively. Control circuit 71 comprises, in general, a printing circuit which permits the printing of a record of the weight of the load on the scale platform, and a switching circuit controlling transfer contacts 69' and 69" so that simultaneously with the printing operation, the effect of the weight remaining upon the scale platform is eliminated from successive weighing operations.

The details of the printing mechanism are fully disclosed and claimed in the above-identified copending application. In general, a plurality of stepped weight selector discs are fixed on the shaft of indicator pointer assembly 67 which is rotated coincidentally with the shaft of servomotor 65. The position of the shaft of indicator pointer assembly 67 sets the discs so that cooperating fingers or feelers can be positioned so as to be indicative of the amount of rotation of the shaft. A series of weight indicating cams are adapted to be rotated individually by respective fingers, to positions indicative of the weight. A printed record of the weight may be had by urging a sheet of paper against the inked peripheries of the weight indicating cams. For simplicity, the detailed mechanism of the printing recorder is not here illustrated.

A normally open relay contact 72' operable by control circuit 71, is connected between conductors 51 and 60 so that upon its closure, the output circuit of the tare weight opposing voltage circuit is connected directly to the input of amplifier 62 and the effect of the net weight voltage opposing circuit is shorted out of the circuit.

The operation of the embodiment of Figure 1 will be discussed without reference to the detailed operation of control circuit 71 or the printing circuit included therein.

With reference to Figure 1, it will be assumed that a load of unknown weight has been placed on the scale platform and that load cell circuit 10 responds in the well known manner to produce a voltage signal representative of the weight of the load between conductors 32 and 37. It is further assumed that the quadrature voltage eliminating circuit of resistor 39 and condenser 41 has been properly adjusted, as well as the zero balance circuit comprising resistors 42—44. At the initiation of the weighing operation, the shafts of tare balance motor 64 and weight balance motor 65 are at their zero weight reference positions, and the opposing voltage circuit potentiometer taps 52 and 54 are at their zero output voltage positions.

At this time, since no opposing voltage is developed in either circuit 20 or circuit 30, the amplitude of the voltage applied to the input of amplifier 62 is the same as that developed by the load cells of circuit 10. Control circuit 71 operates to close relay contacts 69″ to connect the output circuit of the amplifier 62 to the control winding of weight balance motor 65 and to connect the reference winding of weight balance motor 65 to A.C. power. The application of voltage to the control winding of motor 65 causes its shaft to rotate and through coupling 70 to move tap 54 of potentiometer 55.

The movement of tap 54 of the net weight opposing voltage circuit 30 causes an opposing voltage signal to be established in series with the weight indicative voltage to reduce its amplitude. As motor 65 continues to rotate under the influence of the applied control voltage, its shaft further moves tap 54 until the opposing voltage produced in circuit 30 equals the voltage of load cell circuit 10, and their difference is zero.

The rotation of the shaft of servomotor 65 is also transmitted over linkage 70 to indicator 66 to rotate the indicator pointer to visually indicate the weight of the load. At the same time the printing recording mechanism responds to the servomotor rotation to establish a printing condition for establishing a permanent record. By initiating the printing cycle, in the manner to be explained in greater detail hereinafter, a record of the weight is printed. Either simultaneously or consecutively, with respect to the printing cycle, the effect of the voltage circuit 30 is removed from the circuit by closure of relay contacts 72′. The output circuit of amplifier 62 is transferred over contacts 69′ to tare balance servomotor 64. In eliminating the net weight opposing voltage, there exists in the system an unbalance of voltages which is reflected in the control winding of servomotor 64. Servomotor 64 responds and through linkage 68 adjusts variable tap 52 of potentiometer 46 to produce an opposing voltage in tare balancing circuit 20 which voltage equals the load generated voltage to re-establish a balanced voltage condition. At this time the control voltage for servomotor 64 becomes zero and the motor stops.

Subsequently, by opening contacts 72′, the opposing voltage existing in net weight balance circuit 30 is reintroduced to the system to cause a further unbalanced voltage in the system. At the same time the output circuit of amplifier 62 is transferred over contacts 69″ to the control winding of weight balance servomotor 65, and servomotor 65 responds to the unbalance voltage applied to its control winding by moving tap 54 of potentiometer 55 in a direction to remove the opposing voltage generated in weight balancing circuit 30. The indicator returns to zero and the printer mechanism is restored to its zero condition.

The scale is now prepared to accept and weigh another load without the physical removal of the first load. The process can be repeated indefinitely, limited only by the capacity of the tare weight opposing voltage generating circuit 20.

A more detailed operation of the embodiment of Figure 1 may be understood by a consideration of Figure 2 which illustrates the circuitry of the amplifier and control circuit 40 of Figure 1 in greater specificity. In Figure 2 a source of alternating current 75, which supplies the operating current for the complete embodiment, is connected over conductors 76 and 77 to the remainder of control circuit 71, shown to the left of the dashed line, through a main off-on switch 78 closure of which enables energization of the circuitry of Figures 1 and 2. A pilot light 80 is connected between conductor 77 and one side of switch 78 so that closure of the latter energizes pilot light 80 to indicate the application of line voltage to the scale.

For simplicity of explanation, the various circuits of control circuit 71 are illustrated as being connected in parallel between conductors 77 and 81, conductor 81 being connected between one side of switch 78 and pilot light 80. An initiation control relay 83 has its winding connected in series with a rectifier 84, a current limiting resistor 85 and balance detector relay contacts 86, across conductors 77 and 81. Rectifier 84 converts the alternating current signal between conductors 77 and 81 into a direct current signal for energization of relay 83. A by-pass condenser 88 is connected in shunt to the winding of relay 83 to shunt out any alternating current ripple remaining after the rectification action of rectifier 84, and to prevent relay chatter.

Initiation control relay 83 effects operation of normally closed contacts 83′ and normally open contacts 83″. Balance detector contacts 86 are normally closed, but at times when the output signal of amplifier 62 is of zero amplitude they are opened by the action of a differential relay (not shown) connected across the output of the amplifier. Inasmuch as the specific circuitry of the balance detector circuit is fully disclosed and claimed in the above-cited copending application, it is not shown in detail but is represented herein in block form and designated by numeral 90.

A print motor control relay 92 having normally open contacts 92′ and 92″, has its winding shunted by an A.C. by-pass condenser 91 and is connected across conductors 77 and 81 in series with a rectifier 93, a resistance 94 and the parallel combination of a first circuit including in series normally closed relay contacts 69‴ and a print push button switch 97, and a second circuit including in series relay contacts 92′ and contacts 98 associated with a printer cam 99.

Printer cam 99 is mounted on the shaft of printer motor 101 which is electrically connected to conductor 77 and to conductor 81 over the parallel combination of a first circuit including contacts 102 of printer cam 99 and a second circuit comprising normally open contacts 103′. Printer cam 99 rotates in conjunction with the rotation of the shaft of printer motor 101, and opens contacts 98 and closes contacts 102 when its substantially semi-circular cam surface moves its associated armature 105. Upon rotation, cam 99 interrupts the energizing circuit for print motor control relay 92 and closes a holding circuit over contacts 102 to maintain printer motor 101 energized for one-half revolution of its shaft. Coupled to the shaft of printer motor 101 is the mechanical printing mechanism which produces a printed record of the weight as determined by the amount of rotation of the weight indicator servomotor in the manner previously described. The mechanical equipment associated with the printer motor and its mode of operation is fully taught and claimed in the above-cited copending application, and is not herein repeated.

A second printer motor control relay 103 has its winding connected to conductor 77 and to conductor 81 over the series combination of normally closed contacts 83′, contacts 92′ and printer cam contacts 98. Normally open contacts 103′ of relay 103 are connected in shunt with the normally open contacts 102 of cam 99. Relay contacts 103″ controlled by relay 103, are shunted across relay contacts 83′ to form a holding circuit which upon energization of relay 103 maintains its energization independent of the action of relay 83. Printer motor control relay 103 also controls operation of normally closed relay contacts 103‴ in the energizing circuit of the reference winding 125 of weight balance servomotor 65, to interrupt this circuit and prevent movement of the servomotor during the printing cycle so as to maintain the correct weight indication during this cycle.

A tare balance control relay 72 is connected to conductor 77 and to conductor 81 through the series combination of current limiting resistors 105, 106, rectifier 107 and the parallel combination of a first circuit including a manual balance switch 108 and a second circuit including contacts 109 of automatic balance switch 110 (hereinafter referred to), contacts 92" and contacts 102 of cam 99. An alternating current by-pass condenser 114 is connected in shunt with the winding of relay 72 to prevent relay chatter.

A weight balance to tare balance control relay 69 is connected in shunt with the series combination of resistor 106, rectifier 107, resistor 105 and the winding of relay 72, so that both relays 69 and 72 are simultaneously energized or de-energized. Relay 69 controls the operation of normally open contacts 69′, normally closed contacts 69″, normally closed contacts 69‴, normally open contacts 69⁗a, normally closed contacts 69⁗b, and normally open contacts 69ᵛ.

A pilot light 112 is connected between conductors 77 and 81 in series with manual balance switch 108. Manual balance switch 108 is shunted by a circuit extending from pilot light 112, across contacts 109 of automatic balance switch 110, contacts 92″ and the parallel combination of contacts 102 and 103′.

An alternative energizing circuit for the windings of relays 69 and 72 and pilot lamp 112 extends from the junction of resistor 106 and manual balance switch 108 over contacts 83″, contacts 116 of automatic balance switch 110 and zero balance switch 117 to conductor 81. Automatic balance switch may be manually closed, if its automatic action is desired. Zero balance switch 117 is a switch operated by movement of the shaft of weight balance servomotor 65 when the shaft is positioned to indicate only a slight movement from its zero position or is positioned behind its zero position. Switch 117 may take the form of a microswitch closed by movement of the shaft of weight balance servomotor 65 or any other type of switch actuable by shaft rotation such as a cam operated switch. A more detailed explanation of the function of the zero balance switch 117 will be discussed hereinafter.

A third alternative holding circuit for relays 72 and 69 extends from the junction of resistor 106 and manual balance switch 108 over contacts 83″, contacts 69ᵛ and contacts 69⁗a to conductor 81.

The tare balance servomotor 64 shown in block form in the embodiment of Figure 1, is shown in greater detail in Figure 2. Servomotor 64 is a conventional split phase alternating current motor having a rotor 120 energized for rotation by the interaction of currents in a reference winding 121 and a control winding 122. Upon the application of current to both reference winding 121 and control winding 122, the rotor is inductively rotated until the current in either or both windings is interrupted. The energizing circuit for the reference winding 121 of servomotor 64 is completed over a circuit extending from conductor 77, over winding 121 and contacts 69⁗a to conductor 81. The control winding 122 of zero balance servomotor 64 is connected to the output of amplifier 62 over contacts 69′.

Weight balance servomotor 65, shown in block form in the embodiment of Figure 1, is illustrated in Figure 2 as comprising a rotor 124, a reference winding 125 and a control winding 126. Servomotor 65 is entirely conventional in construction and operation. The reference winding 125 of servomotor 65 is connected over a circuit extending from conductor 77 over reference winding 125, contacts 103‴ and contacts 69⁗b to conductor 81. The control winding 126 of servomotor 65 is connected to the output circuit of amplifier 62 over contacts 69″.

The primary winding 17 of main bridge distribution transformer 16 is connected to conductors 77 and 81 and is immediately energized by closure of main off-on switch 78.

The manner of operation of the preferred embodiment may be explained with reference to Figures 1 and 2. To place the scale in operation, the main off-on switch 78 is closed which results in energization of the main bridge distribution transformer primary winding 17, pilot lamp 80, amplifier 62 and the reference winding 125 of the weight balance servomotor 65 over a circuit extending from power source 75, over switch 78, conductor 81, contacts 69⁗b, normally closed contacts 103‴, reference winding 125 of servomotor 65 and conductor 77 to the main bridge distribution source 75.

The application of power to the primary winding 17 of transformer 16 results in energization of secondary windings 21—26. Energization of secondary windings 21—24 prepares the load cell circuits 11—14 for response to the application of a load to the platform (not shown). Tare weight balancing circuit 20 and net weight balancing circuit 30 are prepared for generation of voltage signals of opposite phase with respect to the voltage signal output of the load cell circuits, by energization of secondary windings 25 and 26 respectively.

A load of unknown weight is placed on the platform and the load cell circuit generates a voltage signal which is proportional to the applied load. At this time no opposing voltage is developed in output circuits of either the tare balancing circuit 20 or the net weight balancing circuit 30. As a result, the voltage signal, undiminished by any opposing voltage, is applied to the input circuit of amplifier 62 over conductors 32 and 60.

The output circuit of amplifier 62 is connected to the control winding 126 of net weight balancing servomotor 65 over contacts 69″, and the amplified voltage signal developed in the amplifier output circuit is applied thereto. Servomotor 65 responds and its armature 124 rotates because of the magnetic field set up as a result of the energization of control winding 126 and reference winding 125. In rotating, the armature moves tap 54 of potentiometer 55 in the output circuit of net weight balancing circuit 30 by means of the mechanical coupling 70 between the motor shaft and the tap. As the tap moves, the output circuit of net weight balancing circuit 30 develops an opposing voltage which bucks the load cell signal voltage and reduces its amplitude. In the well known manner, rotor 124 of servomotor 65 continues to rotate until the magnitude of the opposing voltage developed in net weight balancing circuit 30 equals the magnitude of the load cell signal. At this time the magnitude of the error voltage applied to the input circuit of amplifier 62 (which is the difference voltage between these two voltage signals) becomes zero and the amplitude of the amplified error voltage applied to the control winding of the servomotor 65 also becomes zero.

The rotation of rotor 124 causes movement of the indicator assembly 66 to visually indicate the weight of the load and prepares the selector discs for the recordation of a printed record of the weight.

The balance detector circuit as fully explained in the above-cited copending application, responds to this null voltage condition and opens normally closed contacts 86. The opening of contacts 86 interrupts the energizing circuit for initiation control relay 83. Initiation control relay 83 releases and at its contacts 83′ prepares the energizing circuit for the second printer control relay 103, and at its contacts 83″ prepares the holding circuit for tare weight balancing relay 72 and weight balance to tare balance control relay 69.

The printing circuit is now prepared for energization, and upon closure of manually operated print switch 97, an energizing circuit for printer motor control relay 92 is completed from power source 75, over conductor 76, switch 78, conductor 81, the contacts of switch 97, normally closed contacts 69‴, resistor 94, rectifier 93, the winding of relay 92 and conductor 77 to power source 75.

Relay 92 operates and at its contacts 92′ completes its own holding circuit extending from power source 75 over conductor 76, switch 78, conductor 81, contacts 98, contacts 92′, resistor 94, rectifier 93, the winding of relay 92 and conductor 77 to power source 75, and also completes an energizing circuit for the second printer motor control relay 103, which circuit extends from power source 75, over conductor 76, switch 78, conductor 81, contacts 98 of printer cam 99, contacts 92', contacts 83', the winding of relay 103 and conductor 77 to power source 75.

Printer control relay 103 operates and at its contacts 103' completes an obvious energizing circuit for printer motor 101; at its contacts 103", completes its holding circuit extending from power source 75, over conductor 76, switch 78, conductor 81, contacts 98, contacts 92', contacts 103", the winding of relay 103 and conductor 77 to power source 75; and at its contacts 103''', interrupts the energizing circuit for reference winding 125 of servomotor 65 to prevent its further movement during the printing cycle.

Upon energization of printer motor 101, the printing cycle is initiated and continues until the weight of the load is printed in a record form. The actuation of printer motor 101 rotates cam 99 to close contacts 102 and complete an obvious holding circuit for the continued energization of printer motor 101 during the printing operation.

Rotation of cam 99 opens contacts 98 and interrupts the holding circuit for printer motor control relay 92 and the second printer motor control relay 103, both of which restore to their normally de-energized condition.

During the period of the printing cycle, the effect of the load present upon the scale platform may be eliminated from affecting any future load weighing operations, by closure of manually operated tare weight eliminating switch 108. After operation of this tare weight eliminating circuit as described below, an additional load may be placed on the platform and only the net weight of the new load will be recorded in the subsequent printing cycle. Closure of manually operated tare weight eliminating switch 108 completes the previously described energizing circuits for pilot lamp 112, net weight balance to tare weight balance control relay 69 and tare weight balance control relay 72. Pilot lamp 112 is arranged to be continuously energized during the tare weight balancing cycle, so that the operator may be aware of the condition of the instrument. Its purpose is to indicate to the operator the proper time for the addition of another load, inasmuch as any load added during the tare weight eliminating cycle will also be automatically balanced out.

Tare weight balance control relay 72 operates and at its contacts 72' (Figure 1) shorts out the effect of the opposing voltage generated in the net weight opposing voltage generating circuit 30. As a result, the input signal to amplifier 62 is unbalanced by an amount equal to the amount thus shorted out. The unbalanced input signal results in an amplified error voltage in the output circuit which is applied to balance detector circuit 90. Balance detector circuit 90 responds in the previously discussed manner to close contacts 86 and complete the energizing circuit for initiation control relay 83.

Initiation control relay 83 operates and at its contacts 83' interrupts the original energizing circuit to the second printer motor control relay 103 which is held operative, nonetheless, over its own holding circuit, and at its contacts 83" prepares a holding circuit for relay 69, relay 72 and pilot lamp 112.

It will be recalled that net weight balance to tare weight balance control relay 69 was energized upon manual actuation of switch 108. Relay 69 operates and at its contacts 69' completes an energizing circuit from the output circuit of amplifier 62 to the control winding of tare balance motor 64 to apply thereto the amplified error signal resulting from the shorting out of the net weight opposing voltages circuit 30; at its contacts 69" interrupts the energizing circuit to net weight balance servomotor 65; at its contacts 69''' interrupts the energizing circuit for printer motor control relay 92; at its contacts 69''''a prepares a holding circuit for relay 69, relay 72 and pilot lamp 112, and transfers the reference winding 121 of zero balance servomotor 64 to the voltage source 75; at its contacts 69''''b interrupts the energizing circuit for reference winding 125 of net weight balancing servomotor 65; and at its contacts 69$^v$ completes a holding circuit for relay 69, relay 72 and pilot lamp 112. The holding circuit for relay 69, relay 72 and pilot lamp 112 extends from voltage source 75 over conductor 76, switch 78, conductor 81, contacts 69''''a, contacts 69$^v$, contacts 83", over the parallel separate energizing circuits for relay 69, relay 72 and pilot lamp 112 and over conductor 77 to source 75.

The amplified error signal in the output circuit of amplifier 62 is applied to the control winding 121 of tare balance servomotor 64. The rotor 120 of servomotor 64 responds to the simultaneous application of both the control voltage signal and the voltage signal applied to its reference winding 121, and rotates in a predetermined direction. This rotation of rotor 120 causes through linkage 68, movement of tap 52 of potentiometer 46 of tare weight opposing voltage generating circuit 20, in a direction causing the generation of an opposing voltage signal in the output portion of circuit 20. Rotor 120 continues rotation and moves tap 52 until the magnitude of the counterbalancing voltage generated in circuit 20 equals the magnitude of the load responsive voltage generated in the load cell circuit 10. At this time the magnitude of the amplified error voltage in the output circuit of amplifier 62 becomes zero. Balance detector circuit 90 responds to the null voltage in the amplifier output circuit, and opens contacts 86 which interrupts the energizing circuit for initiation control relay 83.

Initiation control relay 83 restores and at its contacts 83' prepares the energizing circuit for the second printer control relay 103, and at its contacts 83" interrupts the holding circuit for relay 69, relay 72 and pilot lamp 112.

Net weight to tare weight balance relay 69 restores and at its contacts 69' and 69" transfers the output circuit of amplifier 62 from the control winding 122 of tare balance motor 64 to the control winding 126 of net weight balance motor 65; at its contacts 69''' prepares the energizing circuit of printer motor control relay 92; at its contacts 69''''a and 69''''b transfers voltage source 75 from reference winding 121 of servomotor 64 to reference winding 125 of net weight balance servomotor 65; and at its contacts 69$^v$ further interrupts the holding circuit for relay 69, relay 72 and pilot lamp 112.

Tare weight balance control relay 72 restores and at its contacts 72' opens the shorting circuit for net weight opposing voltage generating circuit 30. The effect of this is to add to the opposing voltage generated in the tare weight opposing voltage circuit 20 an additional voltage which again unbalances the system. The resultant unbalance voltage is again applied to the input circuit of amplifier 62 and hence, in amplified form to the control winding 126 of servomotor 65.

Servomotor 65 responds to the amplified error signal thus produced, and its rotor through linkage 70 moves tap 54 of potentiometer 55 in the net weight opposing voltage circuit 30 in a direction so as to reduce the magnitude of the error signal. Since the magnitude of the load responsive signal voltage generated on the load cell circuit 10 is equal to the magnitude of the opposing voltage developed in circuit 20, servomotor 65 continues to effect reduction of the opposing voltage developed in the net weight opposing voltage circuit 30 until it reaches zero.

Upon reaching the null condition, balance detector circuit 90 responds to open contacts 86 and interrupt the energizing circuit for initiation control relay 83.

Initiation control relay 83 restores and at its contacts 83' prepares the energizing circuit for second printer motor control relay 103 and at its contacts 83" further interrupts the energizing circuit for relay 69, relay 72 and pilot lamp 112.

At this time the load on the platform produces in load cell circuit 10 a voltage signal the magnitude of which is proportional to the weight thereon, and a countervoltage of equal amplitude is produced in tare weight opposing voltage generating circuit 20. The recorder circuit has returned the selector discs to indicate zero weight under the control of servomotor 65 which has also returned tap 54 of potentiometer 55 in circuit 30 to a zero voltage output condition. The indicator mechanism 66 likewise indicates a zero net weight condition.

Further, if printer motor control switch 97 is closed, the printer motor 101 will be energized over its previously discussed circuit, to record in this case a weight of zero.

If now an additional load is placed on the scale, voltage unbalance will result since the magnitude of the output voltage signal generated in load cell circuit 10 will increase proportionally prior to any change in the voltage output signals from either the tare weight opposing voltage circuit 20 or the net weight opposing voltage circuit 30. This unbalanced voltage signal is amplified by amplifier 62 and applied to the control winding 125 of servomotor 65. Servomotor 65 responds in the previously discussed manner to effect rebalance of the scale by adjusting tap 54 of potentiometer 55 until an opposing voltage signal of sufficient amplitude to result in a null condition, is generated by net weight opposing voltage generating circuit 30.

In the previously described manner, printer motor 101 is energized to record the net weight of the new load. Subsequently, operation of manual tare eliminating switch 108 transfers the output circuit of amplifier 62 to the control winding 121 of servomotor 64 and the net weight opposing voltage signal is shorted out of the circuit by the closure of contacts 72'. Tare balancing servomotor 64 responds to add to the opposing voltage signal produced in tare weight balancing circuit 20, sufficient additional voltage to compensate for the new load, and thus the effect of the total load on the platform is eliminated preparatory to weighing the next succeeding load.

In summary, therefore, the electronic scale, as thus far described, provides a means for recording the net weight of each of a succession of loads on a scale without the physical removal of any one of the previously weighed loads.

In order to speed up the operation of the novel electronic scale device, it has been found advantageous to incorporate an automatic balance switch 110 having ganged contacts 109 and 116. The use of this switch supersedes that of manual balance switch 108 and it is placed in circuit by manual closure. Closure of contacts 109 effectively creates a circuit in parallel with switch 108 for the energization of relay 69, relay 72 and pilot lamp 112. This latter circuit is operative during the printing cycle and extends from power source 75, over conductor 76, the contacts of main power switch 78, conductor 81, normally open contacts 102 of printer cam switch 99, contacts 92", contacts 109, through the parallel combination of the energizing circuits for relay 69, relay 72 and pilot lamp 112, and conductor 77 to power source 75.

It will be recalled that upon closure of printer control switch 97, the winding of relay 92 is energized, resulting in the energization of relay 103. When relay 92 operates, its contacts 92" close to prepare the above described energizing circuit for relay 69, relay 72 and pilot lamp 112. Relay 103 operates and at its contacts 103' completes the energizing circuit for printer motor 101 and the above described energizing circuit for relay 69, relay 72 and pilot lamp 112. Printer motor 101 operates and rotates cam 99 to close contacts 102 and complete a holding circuit for the tare weight eliminating circuitry as above described. Thus, there is provided the simultaneous recording of the net weight of the load and the generation of an electrical voltage of corresponding amplitude in tare weight balancing circuit 20, so that upon completion of the printing cycle, the scale is prepared to accept and record the net weight of the next succeeding load without an additional time lapse.

After the final load of the sequence has been weighed; its weight recorded, and the net weight balance circuit is restored to zero voltage output, the tare balance circuit generates an opposing voltage equal to the load cell circuit voltage. If now a part of or all of the load be removed from the scale, the tare balance opposing voltage must be proportionally reduced so that subsequent weighing operations will be accurate. In order to actuate the tare balancing servomotor 64 under these circumstances, a zero limit switch 117 is provided for energizing the net weight to tare weight balance control relay 69 and the tare weight balance control relay 72. Switch 117, which may be a microswitch or other contact closing device, is coupled to the shaft of servomotor 65 in such manner as to close when the shaft tends to rotate back past the zero point in an effort to find the balance point.

Upon closure of switch 117, relay 69, relay 72 and lamp 112 are energized over a circuit extending from power source 75, over conductor 76, the contacts of switch 78, conductor 81, contacts 117, contacts 83", the parallel energizing circuit for relay 69, relay 72 and pilot lamp 112, and conductor 77 to power source 75.

Relay 69 operates and completes the enabling circuits for tare balance servomotor 64 which responds to the unbalance in the system to reduce the tare weight opposing voltage to an amount equal to the weight remaining on the scale or to zero if all loads have been removed therefrom. The effect of the net weight opposing voltage circuit 30 is removed from the circuit by the closure of shorting contacts 72' under the control of tare weight balance control relay 72.

In summary therefore, the scale is prepared to weigh additional loads whether or not previous loads have been physically removed; thus, providing a scale of exceeding flexibility. The elimination of the effect of previous loads, even though on the platform, may be accomplished during the recording cycle so as to effect a time saving in the weighing operation. The scale, in effect, automatically tracks the addition or removal of loads and gives an accurate record of the net weight of any load individually.

Although only a single embodiment of the invention has been illustrated and described, other modifications, changes and alterations may be made therein without departing from the scope of the appended claims.

I claim:

1. A weighing system comprising load receiving means, a load responsive circuit connected to said load receiving means for developing a voltage signal whose magnitude is a direct function of the load applied to said load receiving means; a first voltage balancing circuit connected to said load responsive circuit for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; a null voltage detector circuit connected in series with said load responsive circuit, said first voltage balancing circuit and said second voltage balancing circuit for sensing balance and unbalance voltage conditions in said voltage developing circuit; and control means connected to said null voltage detector circuit and operable in response to an unbalanced voltage condition sensed thereby, for effecting operation of said first voltage balancing circuit until the magnitude of said voltage of said first circuit equals the magnitude of said voltage of said load responsive circuit, said control means having further means for then electrically bypassing said first circuit and eliminating the effect of said voltage of said first circuit, said control means being operable, then for effecting operation of said second voltage balancing circuit, and thereupon reducing said first voltage to zero, whereby there is stored in said second voltage balancing circuit a voltage signal equal to the magnitude of said load responsive voltage.

2. A weighing system comprising load receiving means, a load responsive circuit connected to said load receiving means for developing a voltage signal whose magnitude is a direct function of the load applied to said load receiving means; a first voltage balancing circuit connected to said load responsive circuit for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; means connected in series with said load responsive circuit, said first voltage balancing circuit and said second voltage balancing circuit for algebraically adding said voltage signals generated by said voltage developing circuits, and a balance detector circuit for sensing balance and unbalance voltage conditions resulting from said algebraic adding operation; and control means connected to said balance detector circuit and operable in response to an unbalanced voltage condition sensed thereby, for effecting operation of said first voltage balancing circuit to produce a voltage the magnitude of which is equal to the magnitude of said load developed voltage, said control means having further means for then electrically bypassing said first voltage circuit and eliminating the effect of said voltage of said first circuit, said control means being operable then for effecting operation of said second voltage balancing circuit to produce a voltage the magnitude of which is equal to the magnitude of said load developed voltage, and thereupon reducing said first voltage to zero, whereby there is stored in said second voltage balancing circuit a voltage signal equal to the magnitude of said load responsive voltage.

3. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; a first reversible motor connected to said first voltage balancing means for controlling the magnitude of said first variable magnitude voltage, a second reversible motor connected to said second voltage balancing means for controlling the magnitude of said second variable magnitude voltage, control means connectible to each of said reversible motors for operating said first motor until the magnitude of said first variable voltage equals the magnitude of said load generated voltage; said control means further including means for subsequently eliminating the effect of said first variable voltage from said weighing system for then operably connecting said second reversible motor in circuit until the magnitude of said second variable voltage equals the magnitude of said load generated voltage, and thereupon reducing said first voltage to zero, whereby there is stored in said second voltage balancing circuit a voltage signal equal to the magnitude of said load responsive voltage.

4. A weighing system comprising load receiving means, a load responsive circuit connected to said load receiving means for developing a voltage signal whose magnitude is a direct function of the load applied to said load receiving means; a tare voltage balancing circuit connected to said load responsive means for developing a first voltage of variable magnitude in phase opposition to said load generated voltage signal; a net weight voltage balancing circuit connected in series with said load responsive circuit and said tare voltage balancing circuit for developing a second voltage of variable magnitude in phase opposition to said load generated voltage signal; a control means for sensing a first balance condition between the magnitude of said load responsive voltage and that of said net weight balancing voltage and operable upon sensing said balance condition to eliminate said voltage of said net weight balancing circuit and effect operation of said tare weight balancing circuit for storing therein a voltage signal equal to the magnitude of said load responsive voltage.

5. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; a printing mechanism operably connected to said first opposing voltage developing circuit for recording the weight of a load; a null voltage detector circuit connected in series with said load responsive circuit, said first voltage balancing circuit and said second voltage balancing circuit for sensing balance and unbalance voltage conditions in said voltage developing circuits; and control means connected to said null voltage detector circuit and operable in response to an unbalanced voltage condition sensed thereby, for effecting operation of said first voltage balancing circuit until the magnitude of said voltage of said first circuit equals the magnitude of said voltage of said load responsive circuit, said control means having further means for then electrically bypassing said first circuit and eliminating the effect of said voltage of said first circuit, said control means being operable then for effecting opperation of said second voltage balancing circuit, and thereupon reducing said first voltage to zero, whereby there is stored in said second voltage balancing circuit a voltage signal equal to the magnitude of said load responsive voltage.

6. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; a printing mechanism operably connected to said first opposing voltage developing circuit for recording the weight of a load; a null voltage detector circuit connected in series with said load responsive circuit, said first voltage balancing circuit and said second voltage balancing circuit for sensing balance and unbalance voltage conditions in said voltage developing circuits; and control means connected to said printing circuit and said null voltage detector circuit for effecting operation of said first voltage balancing circuit until the magnitude of said voltage of said first circuit equals the magnitude of said voltage of said load responsive circuit, said control means having further means for then electrically bypassing said first circuit and eliminating the effect of said voltage of said first circuit, said control means being then operable for effecting simultaneous operation of said printing circuit and said second voltage balancing circuit and thereupon reducing said first voltage to zero, whereby said scale is prepared for a second net weighing operation upon completion of said printing operation.

7. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; a first reversible motor connected to said first voltage balancing means for controlling the magnitude of said first variable magnitude voltage, a second reversible motor connected to said second voltage balancing means for controlling the magnitude of said second variable magnitude voltage, control means connectible to each of said reversible motors for operating said first motor until the magnitude of said first variable voltage equals the magnitude of said load generated voltage; said control means further including means for subsequently eliminating the effect of said first variable voltage from said weighing system, for then operably transferring energization from said first motor to said second motor for effecting operation of said second voltage balancing circuit to produce a voltage equal to said load generated voltage, and thereupon reducing said first voltage to zero, whereby there is stored in said second voltage balancing circuit a voltage signal equal to the magnitude of said load responsive voltage.

8. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; a first reversible motor connected to said first voltage balancing means for controlling the magnitude of said first variable magnitude voltage, a second reversible motor connected to said second voltage balancing means for controlling the magnitude of said second variable magnitude voltage, indicator means connected to said first reversible motor for indicating the weight equivalent of the instantaneous magnitude of the variable voltage signal controlled thereby, control means connectable to each of said reversible motors for operating said first motor until the magnitude of said first variable voltage equals the magnitude of said load generated voltage; said control means further including means for subsequently eliminating the effect of said first variable voltage from said weighing system, for then operably connecting said second reversible motor in circuit until the magnitude of said second variable voltage equals the magnitude of said load generated voltage, and thereupon reducing said first voltage to zero, whereby there is stored in said second voltage balancing circuit a voltage signal equal to the magnitude of said load responsive voltage.

9. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; a printing mechanism operably connected to said first opposing voltage developing circuit for recording the weight of a load; a null voltage detector circuit connected in series with said load responsive circuit, said first voltage balancing circuit and said second voltage balancing circuit for sensing balance and unbalance voltage conditions in said voltage developing circuits; and control means including a manually operable switch means connected to said printing circuit and said null voltage detector circuit for effecting operation of said first voltage balancing circuit until the magnitude of said voltage of said first circuit equals the magnitude of said voltage of said load responsive circuit, said control means having further means for then electrically bypassing said first circuit and eliminating the effect of said voltage of said first circuit, said control means being operable for effecting simultaneous operation of said printing circuit and said second voltage balancing circuit and thereupon reducing said first voltage to zero, whereby said scale is prepared for a second net weighing operation upon completion of said printing operation.

10. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; an indicator means connected to said first voltage balancing circuit for indicating the weight equivalent of the instantaneous magnitude of the voltage developed therein, control means for effecting operation of said first voltage balancing circuit, then effecting operation of said second voltage developing circuit until the magnitude of said voltage of said first circuit equals the magnitude of said voltage of said load responsive circuit, said control means having further means for then electrically bypassing said first circuit and eliminating the effect of said voltage of said first circuit, said control means being operable for thereupon reducing said first voltage to zero, and switch means operably connected to said indicator means for affecting said control means in its circuit selecting controlling function.

11. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; an indicator means connected to said first voltage balancing circuit for indicating the weight equivalent of the instantaneous magnitude of the voltage developed therein, control means for effecting operation of said first voltage balancing circuit, then effecting operation of said second voltage developing circuit and thereupon reducing said first voltage to zero, and switch means operably connected to said indicator means for effecting operation of said control means to eliminate the effect of the voltage signal developed in said first voltage balancing circuit and effect operation of said second balance circuit to store therein a voltage signal equal to said load generated voltage signal.

12. A weighing system comprising load receiving means, a load responsive circuit connected to said load receiving means for developing a voltage signal whose magnitude is a direct function of the load applied to said load receiving means; a first voltage balancing circuit connected to said load responsive means for developing a first voltage of variable magnitude in phase opposition to said load generated voltage signal; a second voltage balancing circuit connected in series with said load responsive circuit and said first voltage balancing circuit for developing a second voltage of variable magnitude in phase opposition to said load generated voltage signal; an indicator means connected to said first voltage balancing circuit for indicating the weight equivalent of the instantaneous magnitude of the voltage developed therein, control means for effecting operation of said first voltage balancing circuit and then effecting operation of said second voltage developing circuit and thereupon reducing said first voltage to zero; and switch means operably connected to said indicator means for effecting operation of said control means to eliminate the effect of the voltage signal developed in said first voltage balancing circuit, to effect operation of said second balance circuit to store therein a voltage signal equal to said load generated voltage signal, to re-establish said first voltage balance circuit in the system, and to effect further operation of said first voltage balance circuit to reduce the magnitude of said first variable voltage to zero.

References Cited in the file of this patent

UNITED STATES PATENTS

| Number | Name | Date |
|---|---|---|
| 2,516,456 | Fischer | July 25, 1950 |
| 2,610,052 | Macgeorge | Sept. 9, 1952 |
| 2,630,007 | Howe | Mar. 3, 1953 |
| 2,678,206 | Muldoon | May 11, 1954 |
| 2,723,844 | Thurston | Nov. 15, 1955 |
| 2,766,981 | Lauler et al. | Oct. 16, 1956 |